United States Patent
Mahurin (12) 
(10) Patent No.: US 6,173,300 B1
(45) Date of Patent: Jan. 9, 2001

(54) METHOD AND CIRCUIT FOR DETERMINING LEADING OR TRAILING ZERO COUNT

(75) Inventor: Eric W. Mahurin, Austin, TX (US)

(73) Assignee: Advanced Micro Devices, Inc., Sunnyvale, CA (US)

( * ) Notice: Under 35 U.S.C. 154(b), the term of this patent shall be extended for 0 days.

(21) Appl. No.: 09/132,524

(22) Filed: Aug. 11, 1998

(51) Int. Cl.[7] .................................................. G06F 7/00
(52) U.S. Cl. ................................... 708/211; 708/205
(58) Field of Search ..................................... 708/211, 205

(56) References Cited

U.S. PATENT DOCUMENTS

| | | | |
|---|---|---|---|
| 4,247,897 | 1/1981 | McDonald et al. | 701/117 |
| 4,849,920 * | 7/1989 | Simpson et al. | 708/211 |
| 4,924,421 * | 5/1990 | Seguchi | 708/211 |
| 4,954,978 * | 9/1990 | Terane et al. | 708/211 |
| 5,111,415 | 5/1992 | Shackleford | 708/211 |
| 5,241,490 | 8/1993 | Poon | 708/211 |
| 5,345,405 * | 9/1994 | Walsh et al. | 708/211 |
| 5,493,520 | 2/1996 | Schmookler et al. | 708/211 |
| 5,657,260 * | 8/1997 | Makino | 708/211 |
| 5,798,953 * | 8/1998 | Lozano | 708/211 |

* cited by examiner

Primary Examiner—David H. Malzahn
(74) Attorney, Agent, or Firm—Conley, Rose & Tayon, PC; B. Noël Kivlin (57) ABSTRACT

A method and circuit for determining the position of a leading logical one or a trailing logical one in a first n bit operand is disclosed. The method and circuit generates an n bit operand from the first n bit operand. One bit of the n bit operand represents a first logical value while the remaining bits of the n bit operand represent a second logical value. Thereafter, the method and circuit generates a k bit operand relating to the position of the leading or trailing logical one in the first n bit operand. The k bit operand is generated from the n bit operand.

12 Claims, 6 Drawing Sheets

METHOD AND CIRCUIT FOR DETERMINING LEADING OR TRAILING ZERO COUNT

BACKGROUND OF THE INVENTION

1. Field of the Invention

This invention generally relates to the field of microprocessors, and more particularly to a circuit and method for leading or trailing zero detection.

2. Description of the Relevant Art

Microprocessors determine the speed and power of personal computers, and a growing number of more powerful machines, by handling most of the data processing in the machine. Microprocessors typically include at least three functional groups: the input/output unit (I/O), the control unit, and the arithmetic logic unit (ALU). The I/O unit interfaces between external circuitry and the ALU and the control unit. I/O units frequently include signal buffers for increasing the current capacity of a signal before the signal is sent to external components. The control unit controls the operation of the microprocessor by fetching instructions from the I/O unit and translating the instructions into a form that can be understood by the ALU. In addition, the control unit keeps track of which step of the program is being executed. The ALU handles the mathematical computations and logical operations that are performed by the microprocessor. The ALU executes the decoded instructions received from the control unit to modify data contained in registers within the microprocessor.

Usually, the register which stores the operand to be modified has as many bit locations as would be required to store the largest possible number on which the microprocessor has been designed to operate. In many operations, however, the magnitude of the operand is substantially smaller than the magnitude of this largest number. In such a case, the register is filled with zeros to the left of the most significant bit of the operand that is a logical one. The added zeros which fill to the left of the most significant bit are known as the leading zeros.

It is known that the speed at which arithmetic operations on the operand are performed can be increased if the number of leading zeros in the operand is known ahead of time. To this end leading zero detection circuits are provided as part of the microprocessor for counting or detecting leading zeros within an operand. It is also well known that speed and circuit size are two critical parameters in the design of any microprocessor. Often, these two parameters are mutually exclusive in that a faster microprocessor or components thereof operate faster when employing large complex circuitry but which have the disadvantage of occupying a large area within the integrated circuit. Prior art circuits for detecting or counting leading zeros within operands are subject to this principle. One prior art leading zero detection circuit operates quickly (i.e., in one clock cycle) but occupies a significant amount of area within the microprocessor due to its circuit complexity. Another prior art leading zero detection circuit occupies a significantly less area within the microprocessor but requires a significant number of cycles in order to complete a count of the leading zeros within an operand. Typically, this second prior art leading zero detection circuit employs a microcode loop which tests each bit of the operand per clock cycle.

It would therefore be desirable to produce a leading zero (or trailing zero) detector circuit that achieves a significant reduction in the number of clock cycles required to produce a leading zero count without significantly increasing the amount of area required to implement the circuit.

SUMMARY OF THE INVENTION

The problems set forth above are solved by a method or circuit for determining the position of a leading logical one or a trailing logical one in a first n bit operand. In one embodiment, the present invention generates an n bit operand from the first n bit operand. One bit of the n bit operand represents a first logical value while the remaining bits of the n bit operand represent a second logical value. Thereafter, a k bit operand is generated from the n bit operand. The k bit operand relates to the bit position of the leading or trailing logical one in the first n bit operand.

In another embodiment, the present invention can be employed in a method or circuit solely for determining the position of a leading logical one in a first n bit operand. In this embodiment, a second n bit operand is generated from the first n bit operand. The $n^{th}$ most significant bit of the second n bit operand represents a logical zero. The remaining bits of the second n bit operand are generated in accordance with a bit wise ORing operation of the first n bit operand. More particularly, the $m^{th}$ most significant bit of the (n−1) least significant bits of the second n bit operand represents a logical OR of the (m−1) most significant bits of the first n bit operand. The second n bit operand is then logically complemented to generate a third n bit operand. The first n bit operand and third n bit operand are logically ORd to generate a fourth n bit operand. This fourth n bit operand has just one bit which represents a logical one while the remaining bits of the fourth n bit operand represent a logical zero. The fourth n bit operand is used to generate a k bit operand wherein the k bit operand relates to the position of the leading one in the first n bit operand. More specifically, the k bit operand encodes the bit position of the leading one within the first n bit operand. The k bit operand is generated by logically ORing n/2 selected bits of the fourth n bit operand. For example, the most significant bit of the k bit operand is generated by logically ORing the n/2 most significant bits of the fourth n bit operand.

In another embodiment, the present invention may be employed in a method or circuit solely for determining a position of a trailing logical one in a first n bit operand. In this embodiment a second n bit operand is generated as a function of the first n bit operand. The least significant bit of the second n bit operand represents a logical zero while the remaining bits of the second n bit operand are generated using a bit wise ORing function. More particularly, the $m^{th}$ most significant bit of the (n−1) most significant bits of the second n bit operand represents a logical OR of the (n−m−1) least significant bits of the first n bit operand. Once the second n bit operand is generated, the second n bit operand is logically complemented to generate a third n bit operand. Thereafter, the first n bit operand and third n bit operand are logically ORd to generate a fourth n bit operand. Only one bit of the fourth n bit operand represents a logical one while the remaining bits of the fourth n bit operand represent logical zero. Finally, a k bit operand is generated as a function of the fourth n bit operand. This k bit operand relates to the position of the trailing one in the first n bit operand. Each bit of the k bit operand is generated by logically ORing n/2 selected bits of the fourth n bit operand. For example, the most significant bit of the k bit operand is generated by logically ORing the n/2 most significant bits of the fourth n bit operand.

One advantage of the present advantage is that it detects the bit position of a leading or trailing one in an n bit operand.

Another advantage of the present invention is that it counts the number of leading or trailing zeros in an n bit operand.

Yet another advantage of the present invention is that it determines the position of a leading or trailing logical one in two clock cycles.

Still another advantage of the present invention is that it determines the position of a leading or trailing logical one using less area within a microprocessor when compared to the prior art.

BRIEF DESCRIPTION OF THE DRAWINGS

Other objects and advantages of the invention will become apparent upon reading, the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
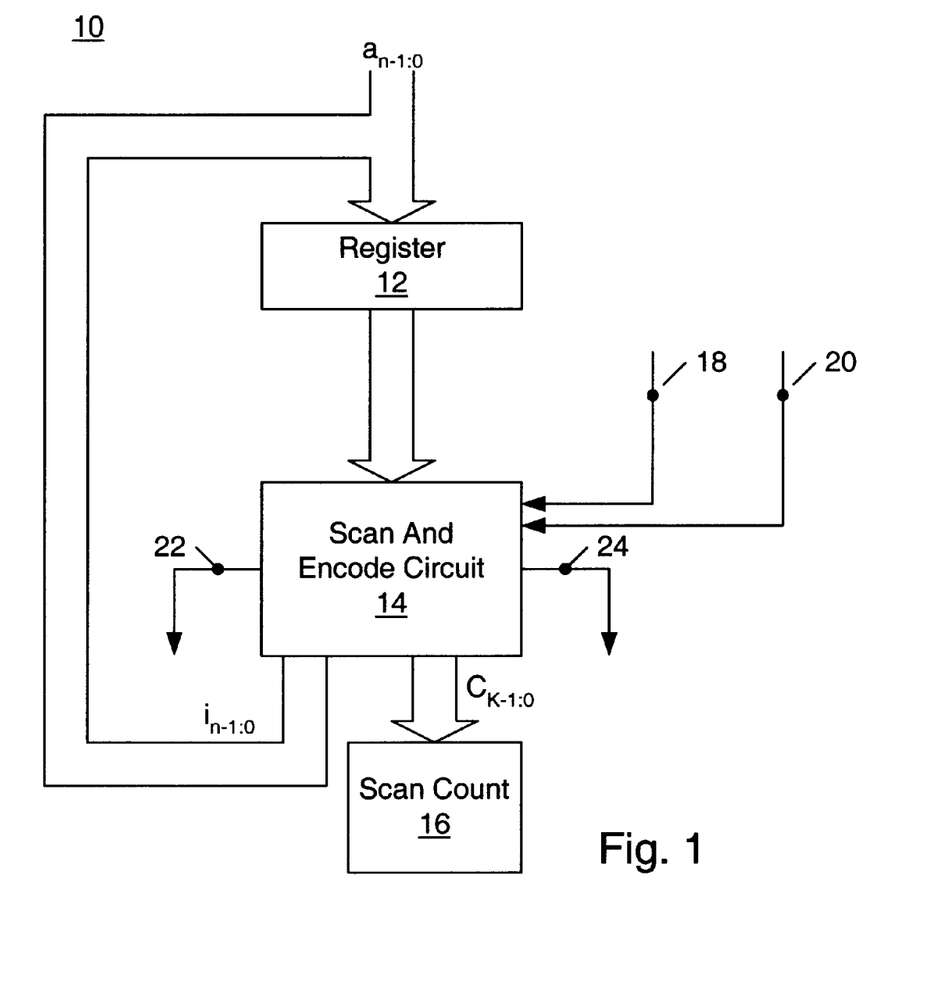
FIG. 1 is a block diagram of a leading or trailing zero detection circuit employing the present invention.

FIG. 1 is a block diagram of a circuit 10 for detecting leading or trailing zeros in a first n bit operand ($a_{n-1:0}$). Circuit 10 includes an operand register 12, a scan and encode circuit 14, and a scan count register 16. Operand register 12 is configured to receive the first n bit operand ($a_{n-1:0}$) or a fourth n bit operand (or isolation operand $i_{n-1:0}$) generated by scan and encode circuit 14. Scan and encode circuit 14 is configured to receive the stored contents of operand register 12, and in response thereto, scan and encode circuit 14 generates n bit isolation operand with $i_{n-1:0}$ or k bit scan count $c_{k-1:0}$ depending upon inputs provided to forward/reverse control node 18 and encode control node 20. Additionally, scan and encode circuit 14 is configured to generate bits at forward zero detect output node or reverse zero detect output node 22 and 24, respectively, when each bit of $a_{n-1:0}$ represents a logical zero.

Scan and encode circuit 14 operates in accordance with control signals provided to control nodes 18 and 20. In particular, scan and encode circuit 14 operates to generate $i_{n-1:0}$ which has a single set bit the bit position of which corresponds to the bit position of the leading set bit $a_{n-1:0}$ when a logical zero is input to both control nodes 18 and 20. Scan and encode circuit 14 operates to generate $i_{n-1:0}$ which has a single set bit the bit position of which corresponds to the bit position of the first trailing set bit in $a_{n-1:0}$ when node 18 receives a logical one and node 20 receives a logical zero. Scan and encode circuit 14 operates to generate a scan count $c_{k-1:0}$ representing an encoded position of the single set bit in the n bit isolation operand $i_{n-1:0}$ when control node 18 receives a logical zero and control node 20 receives a logical one. Table 1 below shows the various operations of scan and encode circuit 14 along with the settings for control nodes 18 and 20 corresponding thereto.

TABLE 1

| operation | forward/reverse (18) | encode (20) |
|---|---|---|
| Isolate leading set bit | 1 | 0 |
| Isolate trailing set bit | 0 | 0 |
| Encode isolated bit | 0 | 1 |

As can be seen in FIG. 1, the n bit isolation operand $i_{n-1:0}$ is fed back to scan and encode circuit 14 via operand register 12 so that the bit position of the single set bit within $i_{n-1:0}$ can be encoded and stored within scan count register 16. Clearly scan and encode circuit 14 performs both functions of generating the n bit isolation operand as a function of the first n bit operand and generating, a scan count as a function of the n bit isolation operand. It is to be understood, however, that the present invention should not be limited thereto. Rather, scan and encode circuit can be separated into two circuits connected in series, the first of which is configured to generate the n bit isolation operand, the second of which is configured to generate the scan count as a function of the n bit isolation operand.

Figure 2:
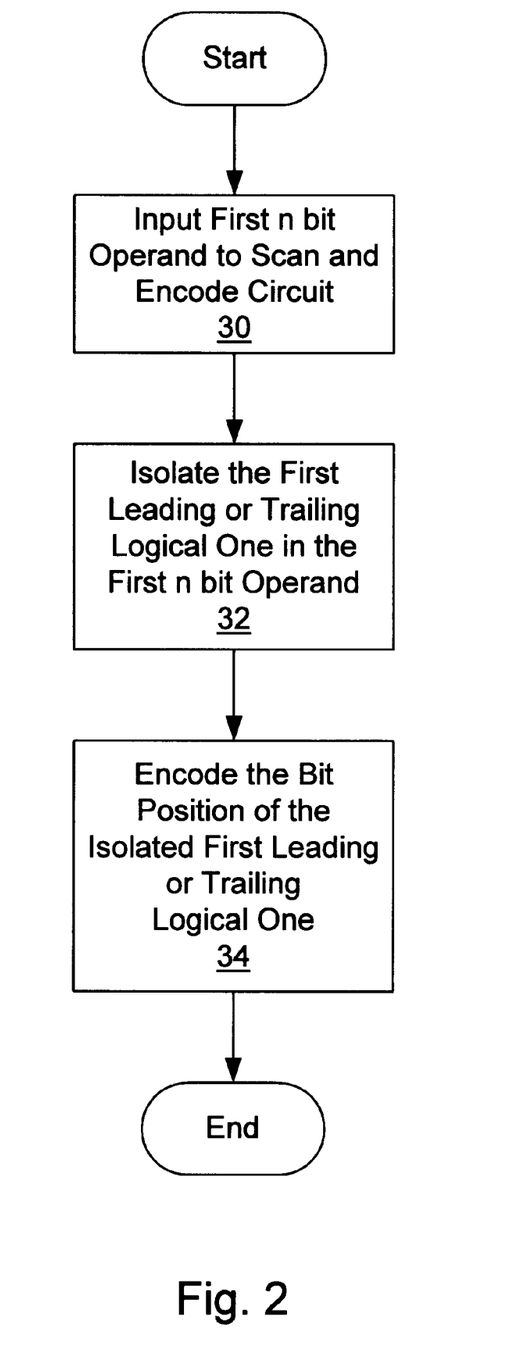
FIG. 2 is a flowchart illustrating operation of the circuit shown in FIG. 1.
Figure 3:
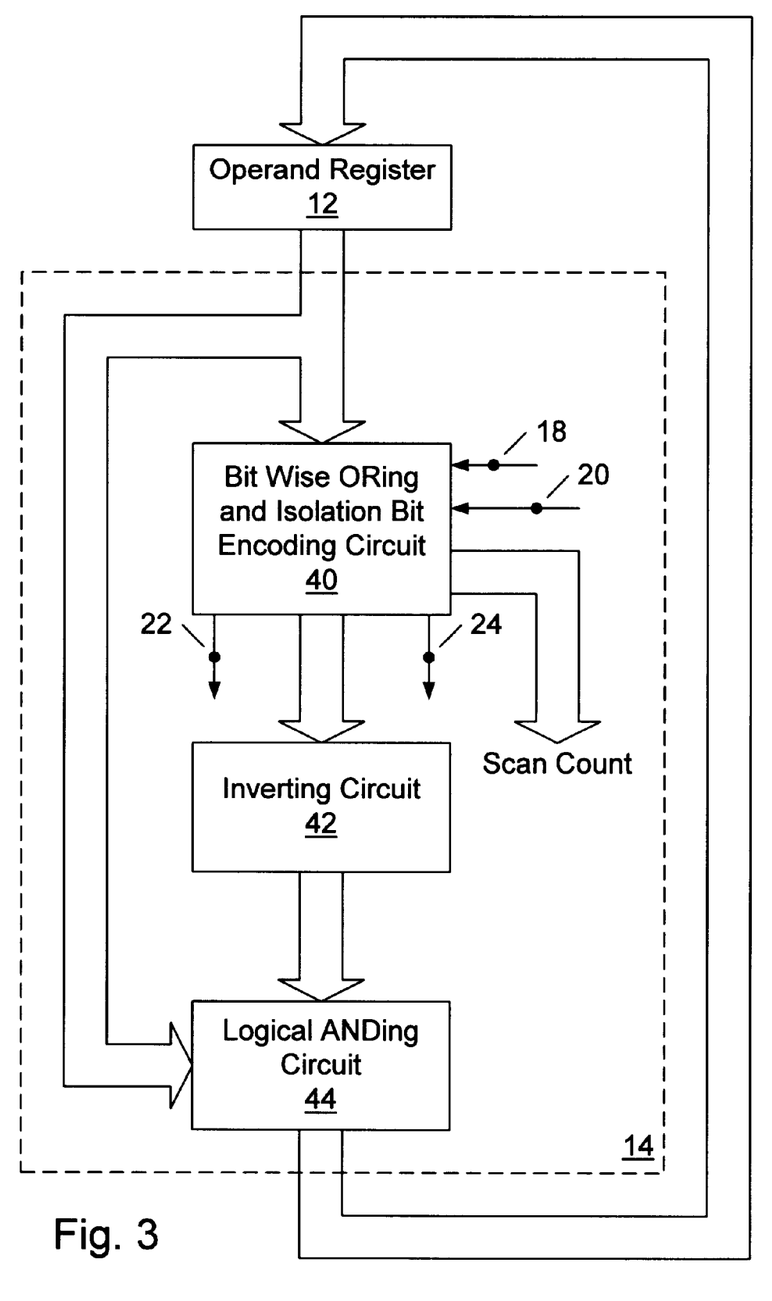
FIG. 3 is a block diagram of the scan and encode circuit of FIG. 1.

FIG. 2 is a flowchart which describes operational aspects of the circuit 10 shown in FIG. 1. In step 30, the first n bit operand is stored in operand register 12 and provided to scan and encode circuit 14 during a first cycle. Control nodes 18 and 20 concurrently receive the appropriate signals to generate an n bit isolation operand $i_{n-1:0}$ having an isolated or single set bit whose bit position corresponds to the first leading or trailing set bit in the first n bit operand. Thereafter, in the second cycle at step 32, scan and encode circuit 14 encodes the bit position of the isolated set bit after isolation operand feedback through operand resister 12. The encoded result or scan count ($c_{k-1:0}$) is provided to scan count register 16 for subsequent use by downstream circuitry such as a double shifter. FIG. 3 is a block diagram representing scan and encode circuit 14 and operand register 12. As can be seen in FIG. 3, scan and encode circuit 14 includes a bit wise ORing and isolation bit encoding circuit (ORing and encoding circuit) 40, inverting circuit 42, and logical ANDing circuit 44. ORing and encoding circuit 40 is coupled to forward/reverse control node 18 and encode control node 20. ORing and encoding circuit 40 operates on first n bit operand $a_{n-1:0}$ or n bit isolation operand $i_{n-1:0}$ according to control signals provided to control nodes 18 and 20. ORing and encoding circuit 40 generates the second n bit operand as a function of the first n bit operand. The second n bit operand is provided to inverting circuit 42. ORing and encoding circuit 40 also generates the scan count $c_{k-1:0}$ as a function of the n bit isolation operand $i_{n-1:0}$ provided thereto. ORing and encoding circuit 40 provides the scan count to scan count register 16 shown in FIG. 1. Additionally, ORing and encoding circuit 40 generates a logical one at forward zero detect output node 22 or reverse zero detect output node 24 when each bit of the first n bit operand represents a logical zero.

Inverting circuit 42 operates to invert each bit of the second n bit operand provided by ORing and encoding circuit 40 thereby generating a third n bit operand which, in turn, is provided to logical ANDing circuit 44. In other words, inverting circuit operates to complement the second n bit operand provided by ORing and encoding circuit 40.

Logical ANDing circuit 44 is coupled to receive the third n bit operand provided by inverting circuit 42 and the first n bit operand provided by operand register 12. Logical ANDing circuit 44 operates to AND corresponding bits of the first and third n bit operands thereby generating a fourth n bit operand (n bit isolation operand). As noted above, the n bit isolation operand is, in turn, provided to ORing and encoding circuit 40 via feedback and operand register 12 during the second cycle of operation, wherein scan and encode circuit 14 generates the scan count as a function of the n bit isolation operand.

Figure 4:
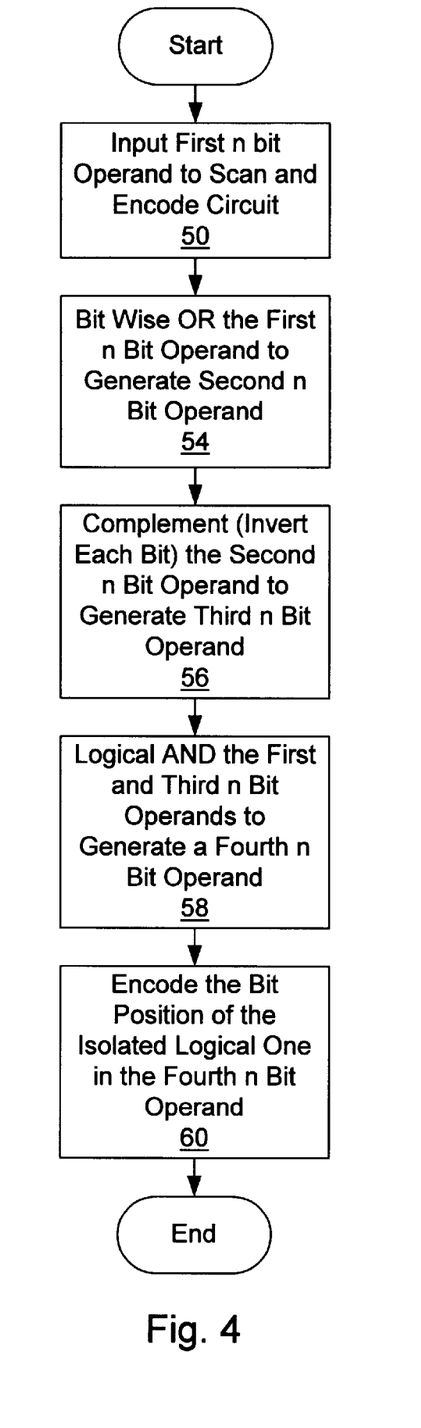
FIG. 4 is a flowchart illustrating operation of the scan and encode circuit shown in FIG. 3.

FIG. 4 is a flowchart illustrating operational aspects of the scan and encode circuit 14 shown in FIG. 3. In step 50, the first n bit operand is provided to ORing and encoding circuit 40 via operand register 12. ORing and encoding circuit 40 operates in one of two modes according to control signals provided to nodes 18 and 20 when perrforming the bit wise ORing operation as shown in step 54. In one mode, ORing and encode circuit 40 generates a second n bit operand associated with the trailing logical one in the first n bit operand. Here ORing and encoding circuit 40 generates the second n bit operand wherein the least significant bit of the second n bit operand represents a logical zero, and the $m^{th}$ most significant bit of the (n−1) most significant bits of the second n bit operand represents a logical OR of the (n−m−1) least significant bits of the first n bit operand. In the other mode, ORing and encode circuit 40 generates a second n bit operand associated with the leading logical one of the first n bit operand. Here ORing and encoding circuit 40 generates the second n bit operand wherein the $n^{th}$ most significant bit of the second n bit operand represents a logical zero, and the $m^{th}$ most significant bit of the (n−1) least significant bits of the second n bit operand represents a logical OR of the (n−1) most significant bits of the first n bit operand.

In step 56, the second n bit operand is provided to inverting circuit 42 which generates the third n bit operand representing the complement of the second n bit operand. In step 58, the corresponding bits of the first and third n bit operands are logically ANDed to generate the fourth n bit operand (n bit isolation operand).

In the second cycle of operation, the n bit isolation operand is fed back to ORing and encoding circuit 40 via operand register 12. Control signals input to control nodes 18 and 20 are changed so that ORing and encode circuit 40 operates to encode the bit position of the single set bit within n bit isolation operand. At step 60, ORing and encoding circuit 40 generates the scan count $c_{k-1:0}$ as a function of the n bit isolation operand.

Figure 5:
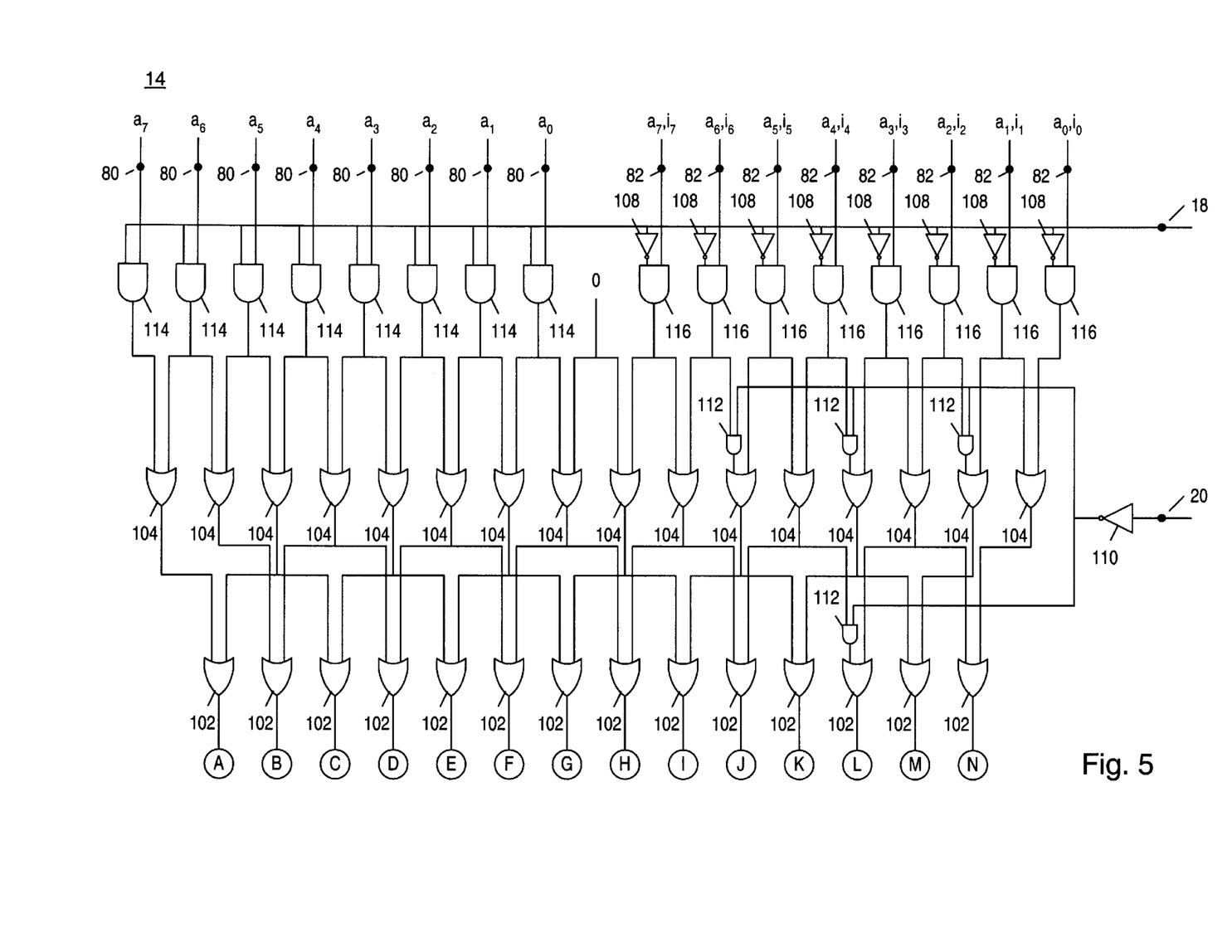
FIG. 5 is a schematic diagram of the scan and encode circuit shown in FIGS. 1 and 3.

FIG. 5 is a schematic diagram of one embodiment of the scan and encode circuit 14 shown in FIGS. 1 and 3. The schematic diagram shown in FIG. 5 represents one embodiment of the present invention it being understood that alternate embodiments are contemplated. Moreover, FIG. 5 is shown as being applicable to operating on eight bit first operands to count the leading or trailing zeros thereof. Again, the present invention should not be limited thereto. Rather, the present invention could be extended to operate on operands with a greater or lesser number of bits.

Scan and encode circuit 14 includes a first set of input nodes 80, a second set of input nodes 82, and a third set of input nodes 84. Each set of input nodes is configured to receive the eight bit first operand $a_{7:0}$ or the eight bit isolation operand $i_{7:0}$. However, to produce scan count $c_{2:0}$, scan and encode circuit 14 only operates on isolation operand $i_{7:0}$ as it is applied to the second set of inputs 82. Scan and encode circuit 14 includes scan count output nodes 86 and isolation operand output nodes 88, Additionally scan and encode circuit 14 includes forward zero detect output node 22 and reverse zero detect output node 24. Scan and encode circuit 14 operates in one of several modes depending upon control signals provided to forward/reverse control node 18 and encode control node 20. Various operations of scan and encode circuit 14 are described above.

In one embodiment, the logical ANDing circuit 44 includes a first set of AND gates 90 each having a pair of inputs and an output coupled to one of the isolation operand output nodes. Each AND gate 90 has a first input coupled to receive a corresponding bit of the first operand $a_{7:0}$ and a second input coupled to an output of an inverter 84. Invertes 84 define one embodiment of the inventor circuit 42. The remaining logical gates in FIG. 5 define, in one embodiment, ORing and encoding circuit 40.

ORing and encode circuit 40 is defined by a first set of OR gates 100, a second set of OR gates 102, a third set of OR gates 104, a first set of inverters 106, a second set of inverters 108, inverter 110, a first set of AND gates 112, a second set of AND gates 114, and a third set of AND gates 116. Each of the middle eight OR gates 100 have an output configured to generate a corresponding bit of the second operand when scan and encode circuit 14 is configured by control nodes 18 and 20 to generate isolation operand from the first operand $a_{7:0}$. First OR gates 100f, 100h and 100i generate corresponding bits of scan count $c_{2:0}$ when scan and encode circuit 14 is configured by control nodes 18 and 20 to generate the scan count. OR gate 100f generates a value representing a logical OR of the fourth, fifth, sixth and seventh bit of the isolation operand $i_{7:0}$ provided to the second set of data inputs 82 when a logical zero is provided to forward/reverse control node 18 and a logical one is provided to the encode control node 20. OR gate 100h generates a value at its output which represents a logical OR of the second, third, sixth and seventh bits of the isolation operand $i_{7:0}$ provided to the second data input 82 when forward/reverse control node 18 receives a logical zero and encode control node 20 receives a logical one. OR gate 100i generates a value at its output which represents a logical OR of the first, third, fifth and seventh bits of the isolation operand $i_{7:0}$ provided to the second set of data inputs 82 when a logical zero is provided to forward/reverse control node 18 and a logical one is provided to encode control node 20. OR gate 100a generates at its output a value which represents a logical OR of each of the bits of the first operand $a_{7:0}$ provided to the first set of data inputs 80 when a logical one is provided to the forward/reverse control node 18. OR gate 100j generates a value at its output which represents a logical OR of each of the bits of the first operand $a_{7:0}$ provided to the second set of data inputs 82 when a logical zero is provided to the forward/reverse control node 18.

Forward/reverse control node 18 is coupled to one input of each of the AND gates 114 and to inverter 108 which in turn is coupled to one input of each of the AND gates 116. The other input of AND gates 114 and 116 are coupled to corresponding input nodes 80 and 82. AND gates 114 operate to pass the operand provided to first input nodes 80 or generate a logical zero at their outputs depending, on the signal received at forward/reverse control node 18. AND gates 116 operate to pass the first operand $a_{7:0}$ or the isolation operand $i_{7:0}$ or generate a logical zero at their outputs depending upon the signal received at forward/reverse control node 18. When scan and encode circuit 14 is configured to generate an isolation operand associated with the first trailing logical one within the first operand $a_{7:0}$, a logical zero is provided to forward/reverse control node 18 which causes AND gates 114 to pass the first operand $a_{7:0}$. When scan and encode circuit 14 is configured to generate an isolation operand associated with the first leading logical one in the first operand or to encode the bit position of the single set bit in the isolation operand, a logical zero is provided to forward/reverse control node 18 thereby causing AND gates 116 to pass either the first operand $a_{7:0}$ or the isolation operand $i_{7:0}$.

AND gates 112 each have a pair of inputs one of which is coupled to the output of inverter 110 which in turn is coupled to encode control node 20. When encode control node 20 receives a logical zero (scan and encode circuit operates to generate the isolation operand), AND gates 112 operate to pass values provided to their first inputs to corresponding OR gates 102 or 104. If scan code control node 20 receives a logical one (scan and encode circuit operates to generate scan count $c_{2:0}$), AND gates 112 zero out the values inputted to their respective first inputs.

Operation of the scan and encode circuit 14 as shown in FIGS. 1, 3 and 5 can best be understood in connection with the following binary expressions. Expression 1 shown below represents an eight bit first operand subject to a lead zero detection operation.

$$d_{7:0}=00010101 \qquad (1)$$

In the first cycle for detecting lead zeroes, a logical one is provided to control node 18 and a logical zero is provided to control node 20. In this configuration, OR gates 100 generate the second operand which represents a bit wise ORing of the first operand. This second operand is reproduced below as expression 2.

$$b_{7:0}=00001111 \qquad (2)$$

As noted above, the most significant bit of the second eight bit operand $b_{7:0}$ represents a logical zero while the $m^{th}$ most significant bit of the seven least significant bits of the second eight bit operand represents logical OR of the (n–1) most significant bits of the first eight bit operand $a_{7:0}$.

Each bit of the second eight bit operand $b_{7:0}$ is inverted and logically ANDed with the corresponding bit of the first operand $a_{7:0}$ via inverters 84 and AND gates 92 thereby generating the fourth eight bit operand or the eight bit isolation operand. Expression 3 below shows the isolation operand resulting from operation on the first and second operands shown in expressions 1 and 2.

$$i_{7:0}=00010000 \qquad (3)$$

As can be seen in expression 3, a single bit is set the bit position of which corresponds to the first leading set bit in the first operand $a_{7:0}$.

Isolation operand $i_{7:0}$ is fed back to the second data inputs 82 at the second cycle of operation. In this second cycle, logical zero is provided to control node 18 and a logical one is provided to control node 20. In this configuration, scan and encode circuit 14 generates the scan count as a function of isolation operand $i_{7:0}$. Expression 4 below shows the scan count associated with expression 3 above.

$$c_{2:0}=100 \qquad (4)$$

The scan count $c_{2:0}$ relates to the bit position of the single set bit in the isolation operand $i_{7:0}$, which in turn relates to the leading set bit in the first operand $a_{7:0}$ and the number of leading zeros within the first operand $a_{7:0}$. As noted above, the scan count $c_{2:0}$ is provided to a scan count register for storage therein. Subsequent circuitry downstream accesses the scan count register in order to, for example, normalize the first operand $a_{7:0}$ as a function of the scan count.

It would be apparent to those skilled in the art having the benefit of this disclosure that scan and encode circuit 14 of the present invention can be implemented in considerably less silicon area than many conventional circuits for detecting the number of leading or trailing zeros in an operand. Further, it will be appreciated that scan and encode circuit 14 of the present invention can operate in considerably less cycles than the prior art. Accordingly, the scanner encode circuit 14 of the present invention provides a leading zero or trailing zero detection using less complex circuitry while maintaining speed advantages.

While the present invention has been described with reference to particular embodiments, it will be understood that the embodiments are illustrative and that the invention scope is not so limited. Leading variations, modifications, additions and improvements to the embodiment described are possible. These variations, modifications, additions and improvements may fall within the scope of the invention as detailed in the following claims.

What is claimed is:

1. A circuit for determining a position of a leading logical one in a first n bit operand, the circuit comprising:
   a first circuit coupled to receive the first n bit operand and configured to generate a second n bit operand as a function of the first n bit operand;
   a second circuit coupled to receive the second n bit operand and configured to generate a third n bit operand as a function of the second n bit operand, wherein the third n bit operand represents a logical complement of the second n bit operand;
   a third circuit coupled to receive both the first and third n bit operands and configured to generate a fourth n bit operand as a function of the first and third n bit operands, wherein each bit of the fourth n bit operand represents a logical AND of corresponding bits of the first and third operands; and
   a fourth circuit coupled to receive the fourth n bit operand and configured to generate a k bit operand as a function of the fourth n bit operand, wherein the k bit operand represents the position of the leading one in the first n bit operand.

2. The circuit as recited in claim 1, wherein the fourth n bit operand has a single bit with a value of logical one in the same position as the position of the leading logical one in the first n bit operand.

3. The circuit as recited in claim 1, wherein k=$\log_2(n)$, and wherein the k bit operand has a value which indicates the position of the leading logical one in the first n bit operand.

4. A circuit for determining a position of a trailing logical one in a first n bit operand, the circuit comprising:
   a first circuit coupled to receive the first n bit operand and configured to generate a second n bit operand as a function of the first n bit operand;
   a second circuit coupled to receive the second n bit operand and configured to generate a third n bit operand as a function of the second n bit operand, wherein the third n bit operand represents a logical complement of the second n bit operand;
   a third circuit coupled to receive both the first and third n bit operands and configured to generate a fourth n bit operand as a function of the first and third n bit operands, wherein each bit of the fourth n bit operand represents a logical AND of corresponding bits of the first and third operands; and a fourth circuit coupled to receive the fourth n bit operand and configured to generate a k bit operand as a function of the fourth n bit operand, wherein the k bit operand represents the position of the trailing one in the first n bit operand.

5. The circuit as recited in claim 4, wherein the fourth n bit operand has a single bit with a value of logical one in the same position as the position of the trailing logical one in the first n bit operand.

6. The circuit as recited in claim 4, wherein $k=\log_2(n)$, and wherein the k bit operand has a value which indicates the position of the trailing logical one in the first n bit operand.

7. A circuit for determining a position of a leading logical one or a trailing logical one in a n bit operand, the circuit comprising:

a first circuit coupled to receive the n bit operand and configured to generate a first n bit operand, wherein the first n bit operand is generated by the first circuit as a function of the n bit operand;

a second circuit coupled to receive the n bit operand and configured to generate a second n bit operand, wherein the second n bit operand is generated by the second circuit as a function of the n bit operand;

an operand complement circuit coupled to receive the first or second n bit operand and configured to generate a first complement n bit operand as a function of the first n bit operand or a second complement n bit operand as a function of the second n bit operand;

a logical ANDing circuit coupled to receive the n bit operand and the first complement n bit operand or the second complement n bit operand, wherein the logical ANDing circuit is configured to generate a first isolated n bit operand as a function of the n bit operand and the first complement n bit operand or a second isolated n bit operand as a function of the n bit operand and the second complement n bit operand, and;

an isolation bit encoding circuit coupled to receive the first isolated n bit operand or the second isolated n bit operand and configured to generate a first k bit operand representing the position of the leading logical one in the n bit operand as a function of the first isolated n bit operand or a second k bit operand representing the position of the trailing logical one in the n bit operand as a function of the second isolated n bit operand.

8. The circuit as recited in claim 7, wherein the first isolated n bit operand has a single bit with a value of logical one in the same position as the position of the leading logical one in the n bit operand.

9. The circuit as recited in claim 7, wherein the second isolated n bit operand has a single bit with a value of logical one in the same position as the position of the trailing logical one in the n bit operand.

10. The circuit as recited in claim 7, wherein $k=\log_2(n)$.

11. The circuit as recited in claim 7, wherein the first k bit operand has a value which indicates the position of the leading logical one in the n bit operand.

12. The circuit as recited in claim 7, wherein the second k bit operand has a value which indicates the position of the trailing logical one in the n bit operand.

* * * * *